US008135998B2

(12) United States Patent
Uchikawa

(10) Patent No.: US 8,135,998 B2
(45) Date of Patent: Mar. 13, 2012

(54) INFORMATION PROCESSOR AND INFORMATION PROCESSING METHOD

(75) Inventor: Hiroshi Uchikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 831 days.

(21) Appl. No.: 11/169,622

(22) Filed: Jun. 30, 2005

(65) Prior Publication Data
US 2006/0005195 A1 Jan. 5, 2006

(30) Foreign Application Priority Data

Jul. 5, 2004 (JP) ................................ 2004-198144

(51) Int. Cl.
G06F 11/00 (2006.01)
(52) U.S. Cl. ........... 714/57; 714/48; 358/1.14; 358/1.15
(58) Field of Classification Search .......... 714/1, 10–13, 714/57; 358/1.14, 1.15
See application file for complete search history.

(56) References Cited

U.S. PATENT DOCUMENTS

| 5,699,494 | A   | * | 12/1997 | Colbert et al. ............... 358/1.15 |
| 7,353,259 | B1  | * | 4/2008  | Bakke et al. .................. 709/208 |
| 2003/0061322 | A1 |   | 3/2003  | Igarashi et al. ............... 709/223 |
| 2003/0182414 | A1 | * | 9/2003  | O'Neill ......................... 709/223 |
| 2004/0025079 | A1 | * | 2/2004  | Srinivasan et al. ............. 714/13 |
| 2004/0249934 | A1 | * | 12/2004 | Anderson et al. ............. 709/224 |
| 2005/0102558 | A1 | * | 5/2005  | Tiittanen et al. ................ 714/11 |

FOREIGN PATENT DOCUMENTS

| JP | 09-134264 | 5/1997 |
| JP | 10-303931 | 11/1998 |
| JP | 11-175272 | 7/1999 |
| JP | 2000019892 A | 1/2000 |
| JP | 2000-085215 | 3/2000 |
| JP | 2000085215 A | * 3/2000 |
| JP | 2000-196801 | 7/2000 |
| JP | 2000196801 A | * 7/2000 |

OTHER PUBLICATIONS

Drawings for JP 2000085215 A—Tsutsumi et al. Mar. 2000.*
Description of Drawing for JP 2000085215 A—Tsutsumi et al. Mar. 2000.*
Office Action, dated Feb. 22, 2008, in JP 2004-198144.
Chinese Office Action dated Nov. 19, 2010 concerning Chinese Patent Application No. 200810125643.3.

* cited by examiner

Primary Examiner — Yolanda L Wilson
(74) Attorney, Agent, or Firm — Fitzpatrick, Cella, Harper & Scinto

(57) ABSTRACT

There is provided an information processor capable of preventing an unintended operation from being caused by configuration information set in the information processor being updated even if the information processor such as a multi-function peripheral receives configuration information from outside during execution of a job, as well as capable of (1) making it possible to know that update has not been performed, (2) making it possible to externally confirm that update has not been performed and (3) updating the configuration information as soon as possible after the job ends; and an information processing method. If configuration information is inputted from an external device via an EthernetÒ 1008 or the like, the information processor included in a multi-function peripheral 1001 or the like determines whether the information processor is executing a job. If it is determined that the information processor is not executing a job, then the received configuration information is recorded and the configuration information is updated. If it is determined that the information processor is executing a job, then the receiving operation is terminated.

20 Claims, 7 Drawing Sheets

FIG. 3

| TYPES OF JOBS | STATUS |
|---|---|
| Copy | 0 |
| Send | 0 |
| Fax | 1 |
| Receive | 1 |
| Print | 0 |
| Device | 1 |

F I G. 5

EQUIPMENT INFORMATION RECEIVING HISTORY

| RECEPTION NUMBER | TIME AND DATE | SENDING-SIDE DEVICE | TYPE OF CONFIGURATION INFORMATION | RESULT | DETAIL CODE |
|---|---|---|---|---|---|
| 5001 | 2003. 9. 15 03:00 | device1. abc. com | GENERAL SETTING | OK | |
| 5002 | 2003. 9. 15 05:00 | device2. abc. com | ADDRESS BOOK | OK | |
| 5003 | 2003. 9. 17 03:00 | device1. abc. com | GENERAL SETTING | OK | |
| 5004 | 2003. 9. 17 05:00 | device2. abc. com | ADDRESS BOOK | OK | |
| 5005 | 2003. 9. 19 03:00 | device1. abc. com | GENERAL SETTING | OK | |
| 5006 | 2003. 9. 19 05:00 | device2. abc. com | ADDRESS BOOK | NG | JOB RUNNING |
| 5007 | 2003. 9. 21 03:00 | device1. abc. com | GENERAL SETTING | OK | |
| 5008 | 2003. 9. 21 05:00 | device2. abc. com | ADDRESS BOOK | OK | |
| 5009 | 2003. 9. 23 03:00 | device1. abc. com | GENERAL SETTING | OK | |
| 5010 | 2003. 9. 23 05:00 | device2. abc. com | ADDRESS BOOK | OK | |

CLOSE

FIG. 7

EQUIPMENT INFORMATION RECEIVING HISTORY

| RECEPTION NUMBER | TIME AND DATE | SENDING-SIDE DEVICE | TYPE OF CONFIGURATION INFORMATION | RESULT | DETAIL CODE |
|---|---|---|---|---|---|
| 5001 | 2003. 9. 15 03:00 | device1. abc. com | GENERAL SETTING | OK | |
| 5002 | 2003. 9. 15 05:00 | device2. abc. com | ADDRESS BOOK | OK | |
| 5003 | 2003. 9. 17 03:00 | device1. abc. com | GENERAL SETTING | OK | |
| 5004 | 2003. 9. 17 05:00 | device2. abc. com | ADDRESS BOOK | OK | |
| 5005 | 2003. 9. 19 03:00 | device1. abc. com | GENERAL SETTING | OK | |
| 5006 | 2003. 9. 19 05:00 | device2. abc. com | ADDRESS BOOK | — | QUEUEING |
| 5006 | 2003. 9. 19 05:15 | device2. abc. com | ADDRESS BOOK | OK | |
| 5007 | 2003. 9. 21 03:00 | device1. abc. com | GENERAL SETTING | OK | |
| 5008 | 2003. 9. 21 05:00 | device2. abc. com | ADDRESS BOOK | OK | |
| 5009 | 2003. 9. 23 03:00 | device1. abc. com | GENERAL SETTING | OK | |

71, 72

CLOSE

INFORMATION PROCESSOR AND INFORMATION PROCESSING METHOD

CLAIM OF PRIORITY

This application claims priority from Japanese Patent Application No. 2004-198144, filed Jul. 5, 2004, which is hereby incorporated by reference herein.

FIELD OF THE INVENTION

The present invention relates to an information processor for receiving and recording configuration information for the information processor sent from an external device and an information processing method.

BACKGROUND OF THE INVENTION

As means for distributing and recording information to be set for a device, such as a copying machine, connected to a network, there have been push-type and pull-type means when such means are roughly classified. As an embodiment of the push-type means, there has been used means for uploading configuration information for some device which has been downloaded to a computer via a WWW browser or the like or configuration information created on a computer to the device.

Especially, there have been constructed such large-scaled network systems as include multiple LAN groups. As means for managing devices on a network in such a large-scaled network system, there is known a technique for sending configuration information to a device on the network from an external device (see Japanese Patent Laid-Open No. 10-303931, for example).

There is also used such means as enables a device to acquire configuration information set for another device connected to a network, not via a computer but directly via the network (see Japanese Patent Laid-Open No. 11-175272, for example).

There is also a technique in which a device determines whether there remains any job and, if there remains any job, the device does not change configuration information (see Japanese Patent Laid-Open No. 09-134264, for example). The device of Patent Document 3 is adapted not to change an encoding key and a decoding key if there remains another print job when receiving and processing an encoded print job.

In conventional push-type embodiments as described above, there is fear that, when an external device such as a computer and other devices sends configuration information, various problems may be caused in a device to receive the configuration information depending on the condition of the device. Assume that a user selects a destination facsimile number set in a device with one-touch operation or from an address book and executes a job to perform facsimile transmission with the number as a destination and that, during execution of the job, the device receives and records new configuration information from an external device, for example. In this case, there is a problem that the facsimile number corresponding to a button "Destination 1" may be changed to another facsimile number during execution of the job, and thereby the facsimile transmission job may be executed with the use of a facsimile number of a destination different from the destination selected before receiving the configuration information.

Next, assume that count management of a device is performed based on an ID and a password. If the ID and the password of the destination of a job is deleted or changed during execution of the job, the job may abnormally operate, or counting is performed with wrong counter information.

Especially when it is set that device configuration information is automatically distributed and recorded by a system administrator at a fixed time every day, rewriting of configuration information is frequently performed without users being involved. Accordingly, in such a system, there is a higher possibility that rewriting of configuration information which is not expected by a user may be caused in a device.

As described in "the background of the invention", it is possible to prevent configuration information from being changed when there is any job. In this case, however, it is inconvenient (1) that there is no means for confirming that the configuration information has not been correctly updated, (2) that an external device, the sending side of configuration information, cannot confirm that the configuration information has not been rewritten in a device which is the receiving side of the configuration information, and (3) that the configuration information is not changed only because there remains a job when new configuration information is received, even though the job may be terminated after a predetermined time.

SUMMARY OF THE INVENTION

An information processor capable of preventing an unintended operation from being caused by configuration information set in the information processor being updated even if the information processor such as a multi-function peripheral receives configuration information from outside during execution of a job, as well as capable of at least one, of (1) making it possible to know that update has not been performed, (2) making it possible to externally confirm that update has not been performed and (3) updating the configuration information as soon as possible after the job ends; and an information processing method.

In order to solve the above problems, an information processor according to the present invention comprises:

input means for inputting configuration information to be set for the information processor from an external device;

determination means for, if the configuration information is inputted, determining whether or not the information processor is executing a job;

recording means for recording the configuration information in a storage area if it is determined by the determination means that the information processor is not executing a job; and history information generation means for generating history information indicating that abnormal termination has occurred, if it is determined by the determination means that the information processor is executing a job.

In order to solve the above problems, an information processor according to the present invention comprises:

input means for inputting configuration information to be set for the information processor from an external device;

determination means for, if the configuration information is inputted, determining whether or not the information processor is executing a job;

recording means for recording the configuration information in a storage area if it is determined by the determination means that the information processor is not executing a job; and notification means for, if it is determined by the determination means that the information processor is executing a job, notifying the external device which is the source of inputting the configuration information of at least one of error information indicating that inputting of the configuration information has been terminated and error information that the configuration information has not been recorded.

In order to solve the above problems, an information processor according to the present invention comprises:

input means for inputting configuration information to be set for the information processor from an external device;

determination means for, if the configuration information is inputted, determining whether or not the information processor is executing a job; and recording means for recording the configuration information in a storage area if it is determined by the determination means that the information processor is not executing a job; wherein the configuration information inputted by the input means is temporarily recorded in a temporary recording area if it is determined by the determination means that the information processor is executing a job, and the configuration information recorded in the temporary recording area is recorded by the recording means if the job is not being executed any more.

In order to solve the above problems, an information processing method according to the present invention comprises:

an input step of inputting configuration information to be set for an information processor from an external device;

a determination step of, if the configuration information is inputted, determining whether or not the information processor is executing a job;

a recording step of recording the configuration information in a storage area if it is determined by the determination step that the information processor is not executing a job; and a history information generation step of generating history information indicating that abnormal termination has occurred, if it is determined by the determination step that the information processor is executing a job.

In order to solve the above problems, an information processing method according to the present invention comprises:

an input step of inputting configuration information to be set for an information processor from an external device;

a determination step of, if the configuration information is inputted, determining whether or not the information processor is executing a job;

a recording step of recording the configuration information in a storage area if it is determined by the determination step that the information processor is not executing a job; and a notification step of, if it is determined by the determination step that the information processor is executing a job, notifying the external device which is the source of inputting the configuration information of at least one of error information indicating that inputting of the configuration information has been terminated and error information that the configuration information has not been recorded In order to solve the above problems, an information processing method according to the present invention comprises:

an input step of inputting configuration information to be set for an information processor from an external device;

a determination step of, if the configuration information is inputted, determining whether or not the information processor is executing a job;

a recording step of recording the configuration information in a storage area if it is determined by the determination step that the information processor is not executing a job; and the configuration information inputted by the input step is temporarily recorded in a temporary recording area if it is determined by the determination step that the information processor is executing a job, and the configuration information recorded in the temporary recording area is recorded by the recording step if the job is not being executed any more.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 3 is an example of a management table for managing jobs to be executed by the multi-function peripherals 1001 and 1002 in the first embodiment;

FIG. 5 shows an example of configuration information receiving history to be generated and recorded by the multi-function peripheral 1002, a receiving-side apparatus in the first embodiment;

FIG. 7 shows an example of configuration information receiving history to be generated and recorded by the multi-function peripheral 1002, a receiving-side apparatus in the second embodiment.

DETAILED DESCRIPTION OF THE PREFERRED EMBODIMENTS

Description will be made below on an image processing apparatus, such as a multi-function peripheral, capable of rewriting configuration information according to an embodiment of the present invention. A multi-function peripheral is used as an example of the image processing apparatus in this embodiment. However, the image processing apparatus may be a copying machine or other apparatuses. Application of the present invention is not limited to such image processing apparatuses but applicable to any information processor only if can rewrite configuration information.

First Embodiment

Figure 1:
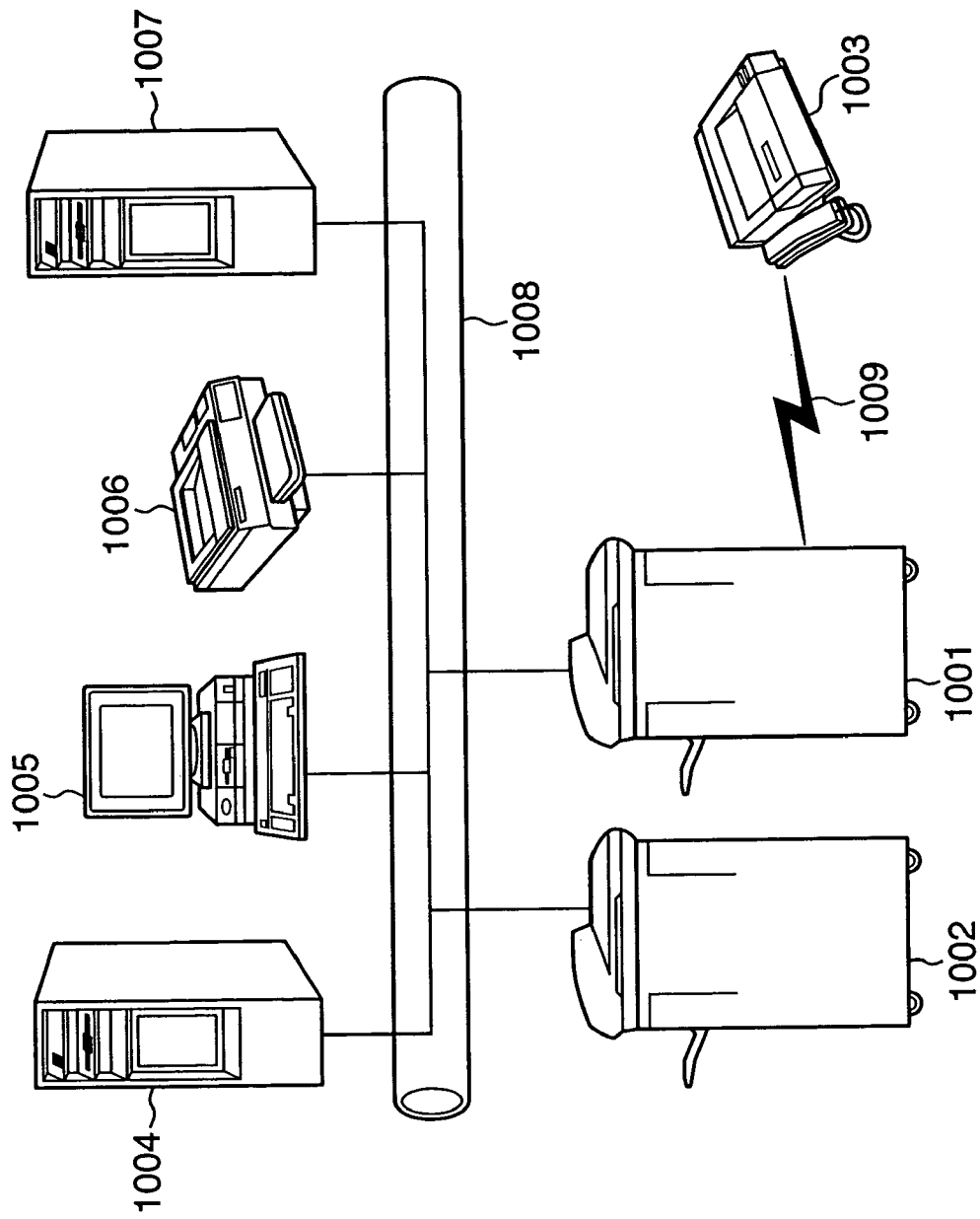
FIG. 1 is a block diagram of a common information processing system in which an information processor in the first embodiment of the present invention is used.

FIG. 1 is a block diagram of a common information processing system in which an information processor in an first embodiment of the present invention is used. In FIG. 1, multi-function peripherals 1001 and 1002 are information processors capable of performing various processings for data obtained by reading an original document and outputting it or sending it to another apparatus. A facsimile machine 1003 can receive data read by the multi-function peripheral 1001 via a public line 1009 and print it. A database/mail server 1004 is a computer on which an application server for storing data read by the multi-function peripherals 1001 and 1002 operates.

A client computer 1005 is a computer for connecting to the database/mail server 1004 to download and display data stored in the database/mail server 1004. A printer 1006 is a printing apparatus for printing image data read by the multi-function peripherals 1001 and 1002 or PDL data generated by the client computer 1005. In a directory server 1007, various directory information is stored, such as the name, e-mail address, facsimile number and the like of a user who utilizes the information processing system. It is possible to access the directory information stored in the directory server 1007 via a protocol, such as LDAP (Lightweight Directory Access Protocol), of the multi-function peripherals 1001 and 1002 or the client computer 1005.

An Ethernet® 1008 is a network to which the multi-function peripherals 1001 and 1002, the database/mail server 1004, the client computer 1005, the printer 1006 and the directory server 1007 are connected. In the information processing system according to this embodiment, it is possible to upload configuration information not via the client computer 1005 but directly from the multi-function peripheral 1001 to the multi-function peripheral 1002 by utilizing the Ethernet® 1008.

Configuration in which configuration information is downloaded by accessing the multi-function peripheral 1001 from the client computer 1005 and then uploading the configuration information to the multi-function peripheral 1002 from the client computer 1005 may be also possible. In this case, the connection medium is not especially limited, and any connection medium can be applied only if it enables two-way communication. Furthermore, as the protocol to be used on the connection medium for sending/receiving of data among the multi-function peripherals 1001 and 1002 and the client computer 1005, any existing protocol may be used, such as HTTP (Hyper Text Transfer Protocol), SOAP (Simple Object Access Protocol) and FTP (File Transfer Protocol). Alternatively, a completely original application protocol may be used.

Figure 2:
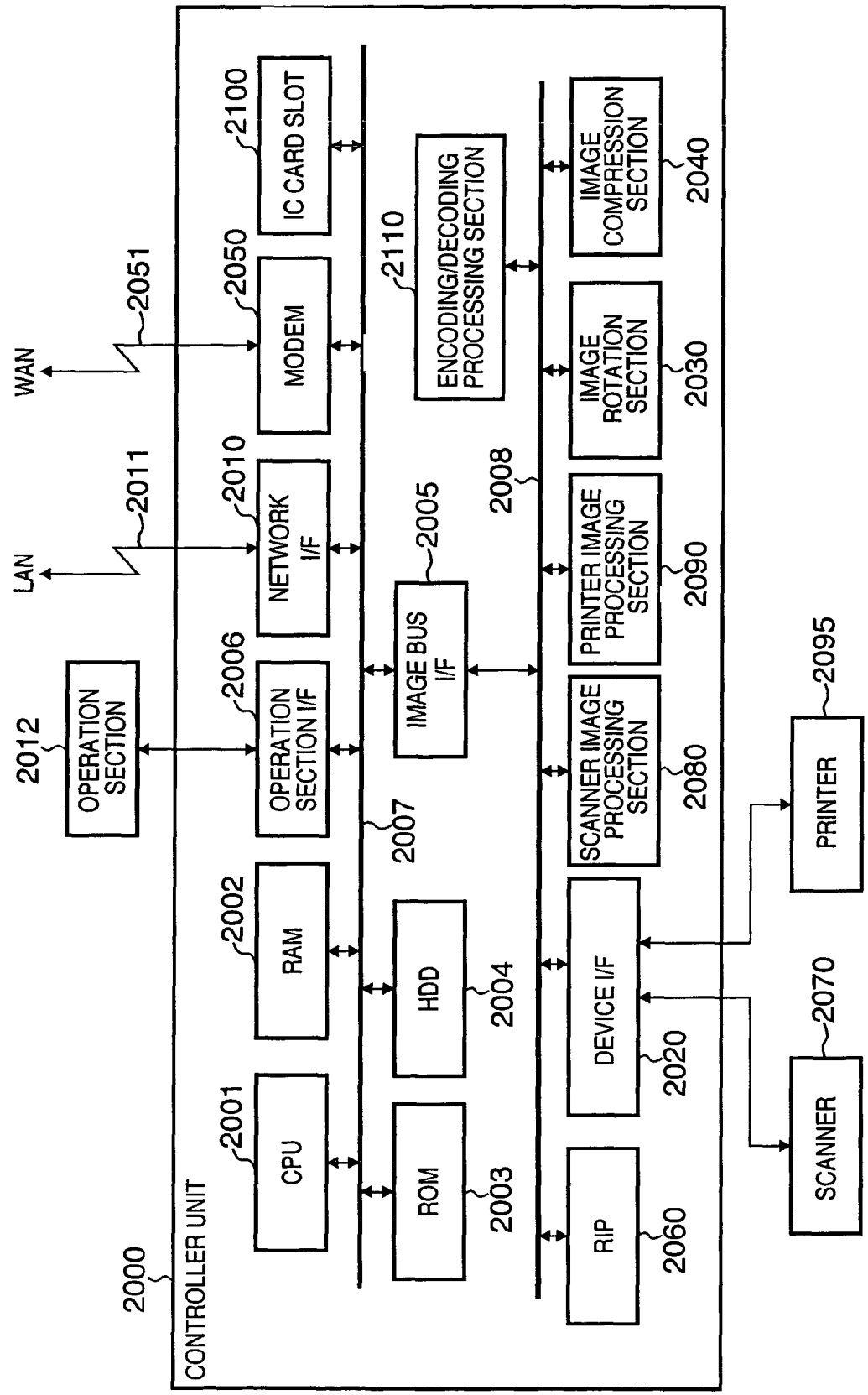
FIG. 2 is a block diagram showing the detailed configuration of a controller unit to be implemented on multi-function peripherals 1001 and 1002 in the first embodiment.

FIG. 2 is a block diagram showing the detailed configuration of a controller unit to be implemented on the multi-function peripherals 1001 and 1002 in the first embodiment. In FIG. 2, a controller unit 2000 is a controller connected to a scanner 2070 which is an image input device and a printer 2095 which is an image output device, and also connected to a LAN 2011 and a public line (WAN) 2051 to perform input/output of image information or device information. A CPU 2001 is a controller for controlling the entire system.

A RAM 2002 is a system work memory for the CPU 2001 to operate, and it is also an image memory for temporarily storing image data (temporary storage). A ROM 2003 is a boot ROM, in which a boot program of the system is stored. An HDD 2004 is a hard disk drive, in which system software, image data and the like are stored. An operation section I/F 2006 is an interface section for interfacing an operation section (UI) 2012 having a touch panel, and outputs image data to be displayed on the operation section 2012 to the operation section 2012. The operation section I/F 2006 communicates information inputted from the operation section 2012 by a user of this system to CPU 2001.

A network I/F 2010 connects to the LAN 2011 and performs input/output of information with an external device (for example, the multi-function peripheral 1002, the client computer 1005 and the like when the information processor is the multi-function peripheral 1001 shown in FIG. 1). A modem 2050 connects to the public line 2051 and performs input/output of information, for example, with the facsimile machine 1003. The devices described above are arranged on a system bus 2007.

An image bus I/F 2005 is a bus bridge for connecting the system bus 2007 and an image bus 2008 which transfers image data at a high speed, and converting a data structure. The image bus 2008 is configured by a PCI or IEEE1394 bus. The following devices are arranged on the image bus 2008. A raster image processor (RIP) 2060 develops a PDL code into an bitmap image. A device I/F section 2020 connects the scanner 2070 or the printer 2095, which are image input and output devices, to the controller 2000 to perform synchronous and asynchronous conversion of image data.

A scanner image processing section 2080 performs correction, processing and editing of inputted image data. A printer image processing section 2090 performs processings such as printer correction and resolution conversion for image data to be printed out. An image rotation section 2030 rotates image data. An image compression section 2040 performs JPEG compression and expansion for multi-value image data and JBIG, MMR or MH compression and expansion for binary image data.

An IC card slot 2100 is enabled to input/output a key used for encoding and decoding by inserting an IC card medium and then inputting an appropriate PIN (personal identifier number) code. An encoding/decoding processing section 2110 is a hardware accelerator board for encoding/decoding data with the use of the key of the IC card slot 2100.

FIG. 3 is an example of a management table for managing jobs to be executed by the multi-function peripherals 1001 and 1002 in the first embodiment. In this embodiment, it is assumed that the multi-function peripheral 1002 can execute five types of jobs classified as copying (Copy), sending of e-mails/files (Send), a facsimile function (Fax), receiving of e-mails/files (Receive) and printing (Print), as an example.

Each of software components managing these jobs is configured to change a job status flag of its job management table to "running" (=1) when a job is started and change the job status flag to "idle" (=0) when the entire job managed by the software component ends. By logically adding the job status flags for the job types, the job status of the entire multi-function peripheral 1001 (Device) can be determined at any given timing. In FIG. 3, the facsimile function (Fax) and the receiving of e-mails/files (Receive) are set to "running" (=1), and the job status of the entire multi-function peripheral 1001 (Device) is also set to "running" (=1).

Figure 4:
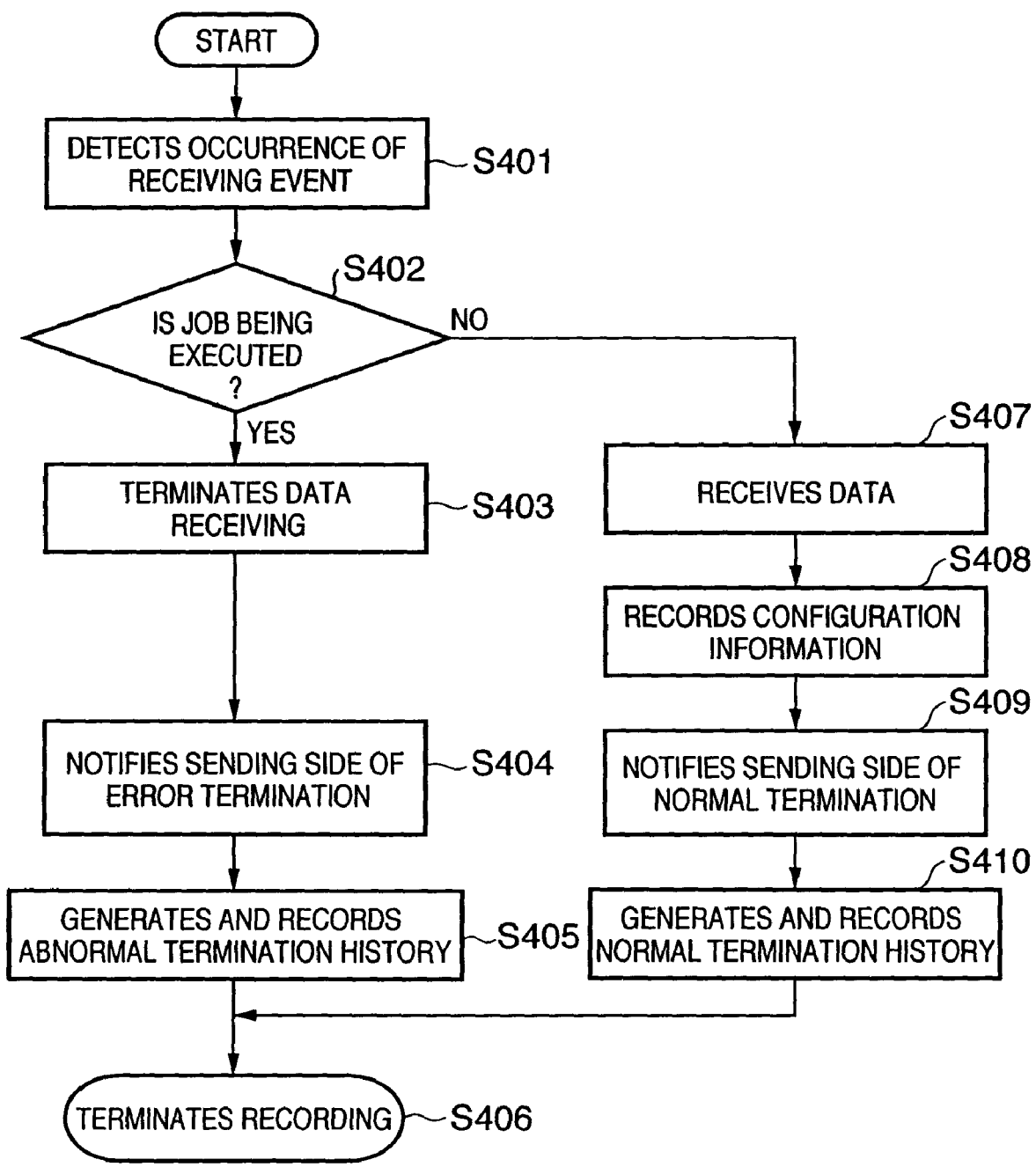
FIG. 4 is a flowchart for illustrating an operation procedure to be performed by the information processor in the first embodiment according to the job operation condition when the information processor receives configuration information.

FIG. 4 is a flowchart for illustrating an operation procedure to be performed by the information processor in the first embodiment according to the job operation condition when the information processor receives configuration information. First, if an information processor detects that an event of receiving configuration information from another apparatus has occurred (step S401), it is determined whether or not a job is being executed (step S402). As a result, if it is determined that a job is being executed (Yes), then the information processor terminates receiving of the configuration information (step S403), and the external device which has sent the information is notified of error information to the effect that receiving of the configuration information has been terminated because of execution of a job (error termination) (step S404). Instead of the error information to the effect that receiving of the configuration information has been terminated (error termination), the information processor may convey error information indicating that the configuration information has not been recorded, at step S404. The information processor generates and records history information showing that abnormal termination has occurred (history information showing abnormal state) (step S405), and terminates the configuration information recording operation (step S406). The history information indicating that abnormal termination has occurred (history information showing abnormal state) may be history information to the effect that receiving of the configuration information has been terminated or to the effect that the configuration information has not been recorded.

On the contrary, if it is determined at step S402 that a job is not being executed (No), the information processor starts receiving of the configuration information is immediately (step S407), and the received configuration information is recorded on a predetermined recording location (step S408). After all the received configuration information is recorded, the information processor notifies the external device which has sent the configuration information that recording has been normally terminated (step S409). Thus, when an information processor has received new configuration information during execution of a job, a sending-side external device can detect that recording of the configuration information received by the information processor has been terminated and can attempt re-sending as necessary.

Furthermore, the information processor generates and records history information indicating normal termination (history information showing normal state) (step S410), and the recording operation of the configuration information is terminated (step S406).

The history information generated and recorded at step S405 or step S410 may be displayed on a monitor or the like of the information processor (namely, the multi-function peripheral 1001 or 1002 which receives configuration information) or outputted on paper or the like. Thereby, when an information processor has received new configuration information during execution of a job, a general user or a system administrator can confirm that the operation of recording the received configuration information to the information processor has been terminated at the receiving-side apparatus.

FIG. 5 shows an example of configuration information receiving history to be generated and recorded by the multi-function peripheral 1002, a receiving-side apparatus in the first embodiment. As shown in FIG. 5, each history record of the configuration information receiving history in this embodiment is configured by a reception number, time and date, sending-side device, type of configuration information, result and detail code. These items indicate an identification number given for each receiving of configuration information, time and date of receiving configuration information, the host name or IP address of a device which has sent configuration information, the type of received configuration information, a processing result, and a detail code indicating details of the processing result, respectively. As the type of configuration information, types such as address book, division management information, general setting and the like may be set.

In the example shown in FIG. 5, the configuration information receiving processing of the reception number 5006, for example, has failed as indicated by the result NG. Furthermore, it is determined that the receiving operation has been terminated because a job was being executed, for the detail code is JOB RUNNING. In the example shown in FIG. 5, all the other configuration information receiving processings have succeeded as indicated by the result OK.

As described above, even if an information processor, such as a multi-function peripheral, capable of rewriting configuration information according to this embodiment receives new configuration information from outside during execution of a job, it is possible to prevent an unintended operation from being caused by configuration information set in the information processor being updated.

Second Embodiment

Next, a second embodiment of the present invention will be described. The basic configuration of an image processing system and an information processor and an example of a job management table in the second embodiment are similar to those shown in FIGS. 1, 2 and 3 described in the first embodiment described above, so that the detailed description thereof will be omitted.

Figure 6:
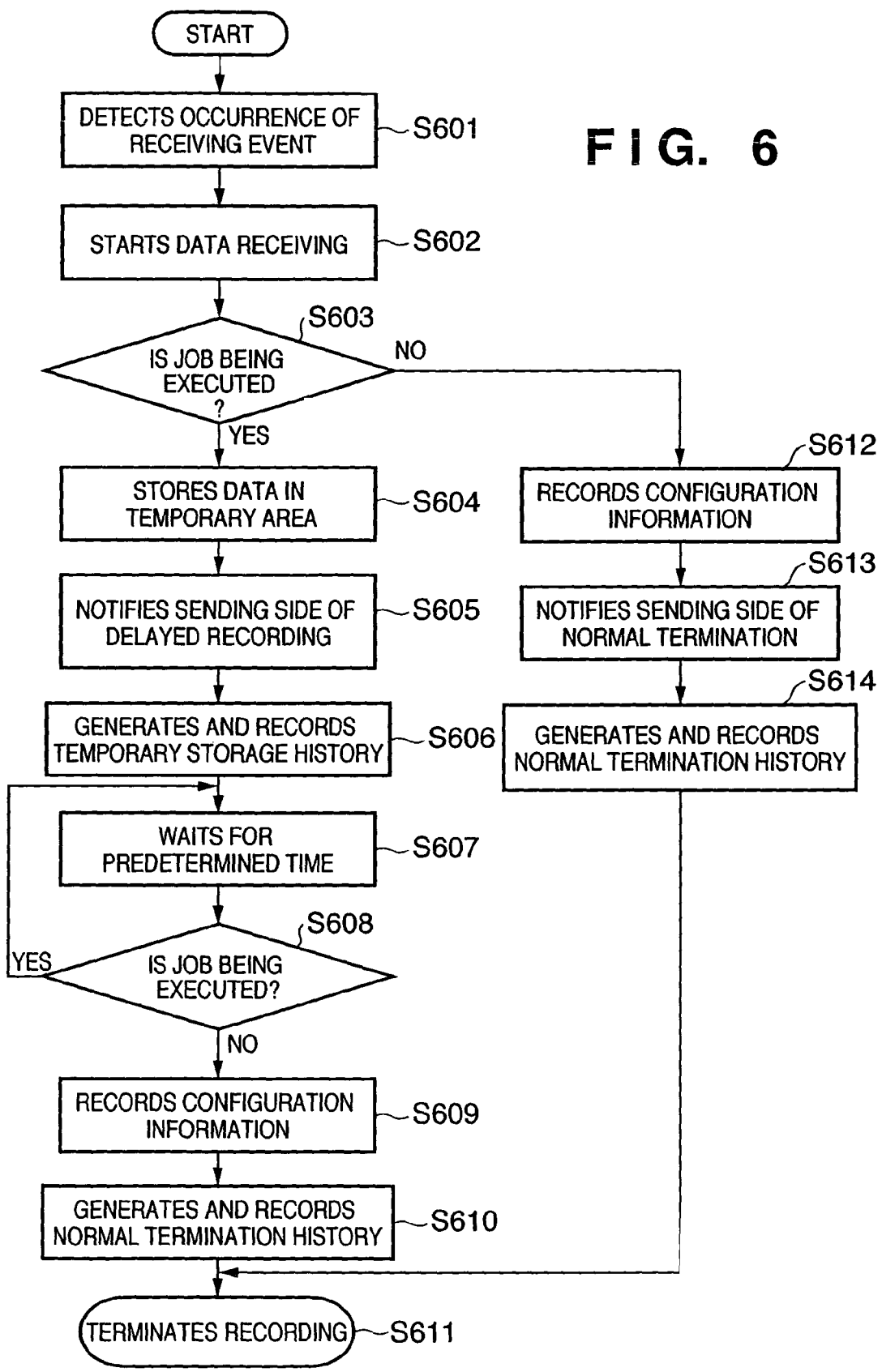
FIG. 6 is a flowchart for illustrating an operation procedure to be performed by an information processor in a second embodiment according to the job operation condition when the information processor receives configuration information.

FIG. 6 is a flowchart for illustrating an operation procedure to be performed by an information processor in a second embodiment according to the job operation condition when the information processor receives configuration information. First, if an information processor detects that an event of receiving configuration information from another apparatus has occurred (step S601), it starts data receiving (step S602) and determines whether or not the information processor is executing a job (S603).

As a result, if it is determined that a job is being executed (Yes), then the information processor stores the received configuration information in a tentative storage area of a RAM or the like (step S604). Then, the information processor notifies the external apparatus which has sent the configuration information that delayed recording will be performed because a job is being executed (step S605), and generates and records tentative storage history (step S606).

Then, the information processor waits for a predetermined time (step S607), and determines again whether the information processor is executing the job (step S608). As a result, if it is determined that the job is still being executed (Yes), then process is returned to step S607. On the contrary, if it is determined that the job is not being executed (No), then the information processor records the configuration information stored in the tentative storage area at step S604 on a predetermined recording location (step S609). Then, the information processor generates and records normal termination history indicating that the configuration information has been normally received and recorded (step S610), and the recording step is terminated (step S611). Thus, even if an information processor receives new configuration information during execution of a job, the information processor can wait until the job ends, and record the new configuration information safely.

On the contrary, if it is determined at step S603 that the job is not being executed (No), the information processor records the configuration information received from the external device on the predetermined recording location (step S612), and the sending-side external device is notified that recording has been normally terminated (step S613). Thus, even if an information processor receives new configuration information during execution of a job, it is possible for a sending-side external device to detect that delayed recording will be performed in which the recording operation is terminated until the end of the job, and thereby avoid unnecessary re-attempt processing. Furthermore, the information processor generates and records normal termination history indicating that the configuration information has been normally received and recorded (step S614), and the recording step is terminated (step S611).

The history information generated and recorded at step S405 or step S410 may be displayed on a monitor or the like of the information processor (namely, the multi-function peripheral 1001 or 1002 which receives configuration information) or outputted on paper or the like. Thereby, when the information processor has received new configuration information during execution of a job, a general user or a system administrator can confirm that the operation of recording the received configuration information to the information processor has been terminated at the receiving-side apparatus.

FIG. 7 shows an example of configuration information receiving history to be generated and recorded by the multi-function peripheral 1002, a receiving-side apparatus in the second embodiment. The configuration and content of each history record of the configuration information receiving history is similar to those described about the history shown in FIG. 5 in the first embodiment described above, so that description thereof will be omitted.

In the example of FIG. 7, the result of the configuration information receiving processing of the reception number 5006 denoted by reference numeral 71 is indicated by "--" and not clarified. However, it is determined that the receiving/recording processing of the configuration information has been stored in a tentative processing queue because a job was being executed, for the detail code indicates QUEUEING. It is determined that the processing has succeeded as the result of the reception number 5006 denoted by reference numeral 72 is indicated as OK subsequently. This is because the configuration information recording processing stored in the tentative processing queue was normally recorded to a predetermined recording location by a recovery processing performed at predetermined intervals, when execution of a job was terminated.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of computer-readable storage mediums that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a storage medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, even if an information processor such as a multi-function peripheral receives configuration information from outside during execution of a job, it is possible to prevent an unintended operation from being caused by configuration information set in the information processor being updated as well as to (1) make it possible to know that update has not been performed, (2) make it possible to externally confirm that update has not been performed, and (3) update the configuration information as soon as possible after the job ends.

As many apparently widely different embodiments of the present invention can be made without departing from the spirit and scope thereof, it is to be understood that the invention is not limited to the specific embodiments thereof except as defined in the appended claims.

What is claimed is:

1. A printer, comprising:
   a monitor;
   a receiving unit constructed to receive configuration information to be set for the printer from a sending device;
   a determination unit constructed to, if an event of receiving the configuration information is detected, determine whether or not the printer is executing a job;
   a recording unit constructed to record the configuration information in a predetermined storage area if it is determined by the determination unit that the printer is not executing a job;
   a control unit constructed to control the recording unit so as not to execute recording the configuration information in the predetermined storage area, and to generate history information indicating that the configuration information has not been recorded in the predetermined storage area, if it is determined by the determination unit that the printer is executing a job; and
   a display unit constructed to display the history information generated by the control unit on the monitor of the printer such that various users of the printer can confirm that the configuration information has not been recorded in the predetermined storage area, wherein the display unit displays information indicating a reason why the recording of the configuration information in the predetermined storage area has not been executed.

2. The printer according to claim 1, wherein the history information generated by the control unit includes information about the sending device which is the source of transmitting the configuration information, or information indicating success or failure of the result of recording the configuration information in the predetermined storage area.

3. The printer according to claim 1, wherein the control unit notifies the sending device of information indicating that the configuration information has not been recorded in the predetermined storage area.

4. The printer according to claim 1, wherein if the printer is executing a job, the control unit controls the recording unit to record the configuration information in a storage area that is different from the predetermined storage area at first, and after the execution of the job has been completed, controls the recording unit to record the configuration information in the predetermined storage area.

5. The printer according to claim 4, further comprising a notification unit constructed to notify the sending device which is the source of transmitting the configuration information of delayed recording information indicating that recording of the configuration information is executed with delay.

6. The printer according to claim 1, wherein the display unit displays the information indicating the reason as a detail information in the history information.

7. A receiving method, comprising:
 a receiving step of receiving configuration information to be set for a printer from a sending device, wherein the printer comprises a monitor;
 a determination step of, if an event of receiving the configuration information is detected, determining whether or not the printer is executing a job;
 a recording step of recording the configuration information in a predetermined storage area if it is determined in the determination step that the printer is not executing a job;
 a control step of controlling the recording step so as not to execute recording the configuration information in the predetermined storage area, and of generating history information indicating that the configuration information has not been recorded in the predetermined storage area, if it is determined in the determination step that the printer is executing a job; and
 a display step of displaying the history information generated in the control step on the monitor of the printer such that various users of the printer can confirm that the configuration information has not been recorded in the predetermined storage area, wherein the display step displays information indicating a reason why the recording of the configuration information in the predetermined storage area has not been executed.

8. The method according to claim 7, wherein the display step displays the information indicating the reason as a detail information in the history information.

9. A non-transitory computer-readable storage medium storing a program for causing execution of:
 a receiving procedure for receiving configuration information to be set for a printer from a sending device, wherein the printer comprises a monitor;
 a determination procedure for, if an event of receiving the configuration information is detected, determining whether or not the printer is executing a job;
 a recording procedure for recording the configuration information in a predetermined storage area if it is determined by the determination procedure that the printer is not executing a job;
 a control procedure for controlling the recording procedure not to execute recording the configuration information in the predetermined storage area, and for generating history information indicating that the configuration information has not been recorded in the predetermined storage area, if it is determined by the determination procedure that the printer is executing a job; and
 a display procedure for displaying the history information generated by the control procedure on the monitor of the printer such that various users of the printer can confirm that the configuration information has not been recorded in the predetermined storage area, wherein the display procedure displays information indicating a reason why the recording of the configuration information in the predetermined storage area has not been executed.

10. The non-transitory computer-readable storage medium storing a program of claim 9, wherein the display procedure displays the information indicating the reason as a detail information in the history information.

11. A printer, comprising:
 a monitor;
 a receiving unit constructed to receive configuration information to be set for the printer from a sending device;
 a recording unit constructed to record the configuration information received by the receiving unit in a predetermined storage area;
 a history information storing unit constructed to store history information indicating a recording result of the recording unit;
 a display unit constructed to display the history information stored by the history information storing unit on the monitor of the printer; and
 a determination unit constructed to, if a receiving event of the configuration information is detected, determine whether or not the printer is executing a job,
 wherein if it is determined by the determination unit that the printer is executing a job, the recording unit does not record the configuration information received by the receiving unit in the predetermined storage area and the history information storing unit stores history information indicating that the configuration information has not been recorded in the predetermined storage area,
 wherein if it is determined by the determination unit that the printer is not executing a job, the recording unit records the configuration information received by the receiving unit in the predetermined storage area and the history information storing unit stores history information indicating that the configuration information has been recorded in the predetermined storage area, and
 wherein the display unit displays information indicating a reason why the recording of the configuration information in the predetermined storage area has not been executed.

12. The printer according to claim 11, wherein the history information includes a time and a date when the configuration information was received.

13. The printer according to claim 11, wherein the history information includes information representing a type of the configuration information.

14. The printer according to claim 11, wherein the history information includes identification information of the sending device which has transmitted the configuration information.

15. The printer according to claim 11, wherein the history information includes a plurality of recording results of the recording unit regarding different configuration information.

16. The printer according to claim 11, wherein the display unit displays the information indicating the reason as a detail information in the history information.

17. A receiving method of a printer, comprising:
 a receiving step of receiving configuration information to be set for the printer from a sending device, wherein the printer comprises a monitor;

a recording step of recording the configuration information received in the receiving step in a predetermined storage area;

a history information storing step of storing history information indicating a recording result of the recording step;

a display step of displaying the history information stored in the history information storing step on the monitor of the printer; and a determination step of, if a receiving event of the configuration information is detected, determining whether or not the printer is executing a job, wherein if it is determined in the determination step that the printer is executing a job, the recording step does not record the configuration information received in the receiving step in the predetermined storage area and the history information storing step stores history information indicating that the configuration information has not been recorded in the predetermined storage area, wherein if it is determined in the determination step that the printer is not executing a job, the recording step records the configuration information received in the receiving step in a predetermined storage area and the history information storing step stores history information indicating that the configuration information has been recorded in the predetermined storage area, and wherein the display unit displays information indicating a reason why the recording of the configuration information in the predetermined storage area has not been executed.

18. The method according to claim 17, wherein the display step displays the information indicating the reason as a detail information in the history information.

19. A non-transitory computer-readable storage medium storing a program for a printer for causing execution of:

a receiving procedure for receiving configuration information to be set for the printer from a sending device, wherein the printer comprises a monitor;

a recording procedure for recording the configuration information received by the receiving procedure in a predetermined storage area;

a history information storing procedure for storing history information indicating a recording result of the recording procedure;

a display procedure for displaying the history information stored by the history information storing procedure on the monitor of the printer; and a determination procedure for, if a receiving event of the configuration information is detected, determining whether or not the printer is executing a job, wherein if it is determined by the determination procedure that the printer is executing a job, the recording procedure does not record the configuration information received by the receiving procedure in the predetermined storage area and the history information storing procedure stores history information indicating that the configuration information has not been recorded in the predetermined storage area, wherein if it is determined by the determination procedure that the printer is not executing a job, the recording procedure records the configuration information received by the receiving procedure in the predetermined storage area and the history information storing procedure stores history information indicating that the configuration information has been recorded in the predetermined storage area, and wherein the display procedure displays information indicating a reason why the recording of the configuration information in the predetermined storage area has not been executed.

20. The non-transitory computer-readable storage medium storing a program of claim 19, wherein the display procedure displays the information indicating the reason as a detail information in the history information.

* * * * *